US 6,550,716 B1

(12) United States Patent
Kim et al.

(10) Patent No.: US 6,550,716 B1
(45) Date of Patent: Apr. 22, 2003

(54) POWER-DRIVEN ORNITHOPTER PILOTED BY REMOTE CONTROLLER

(75) Inventors: Seung-Woo Kim, Daejeon (KR);
Il-Hyung Jang, Daejeon (KR);
Myung-Hwan Kim, Daejeon (KR);
Jong-Seon Kim, Daejeon (KR)

(73) Assignee: Neuros Co., Ltd., Daejeon (KR)

( * ) Notice: Subject to any disclaimer, the term of this patent is extended or adjusted under 35 U.S.C. 154(b) by 0 days.

(21) Appl. No.: 10/184,352

(22) Filed: Jun. 26, 2002

(30) Foreign Application Priority Data

Nov. 30, 2001 (KR) ......................... 2001-75447

(51) Int. Cl.[7] .............................................. B64C 33/00
(52) U.S. Cl. ............................. 244/11; 244/22; 244/72; 446/35
(58) Field of Search .................... 244/22, 72, 11; 446/35

(56) References Cited

U.S. PATENT DOCUMENTS 2,985,407 A * 5/1961 Foster ........................ 244/22
4,729,748 A * 3/1988 Van Ruymbeke ............ 446/35
5,163,861 A * 11/1992 Van Ruymbeke ............ 446/35

* cited by examiner

Primary Examiner—J. Woodrow Eldred
(74) Attorney, Agent, or Firm—Graybeal Jackson Haley LLP (57) ABSTRACT

A power-driven ornithopter piloted by a remote controller wherein a takeoff and landing motion, a climbing and descending motion, and a turning motion of the ornithopter can be controlled using the remote controller. The ornithopter comprises a body, a main wing attached to an upper portion of a front section of the body, and tail wings attached to a rear section of the body. An electric motor, a power transmission mechanism, a battery, first and second servo motors and a controller are installed within a housing of the body. A crank arm is connected to a rotating shaft of the first servo motor and a connecting rod attached to a free end of the crank arm is then pivotally connected to a lower edge of the horizontal tail support. The second servo motor is mounted into a recess formed at an upper side of a rectangular parallelepiped of the horizontal tail support and a rotating shaft of the second servo motor is disposed on a central axis of the horizontal tail. A vertical tail support is supported by the rotating shaft of the second servo motor so that it can be swung on the rotating shaft of the second servo motor in a right and left direction as the rotating shaft of the second servo motor rotates.

12 Claims, 6 Drawing Sheets

POWER-DRIVEN ORNITHOPTER PILOTED BY REMOTE CONTROLLER

BACKGROUND OF THE INVENTION

1. Field of the Invention

The present invention relates to a power-driven ornithopter using an electric motor as a power source, and more specifically, to a power-driven ornithopter piloted by a remote controller wherein a takeoff and landing motion, a climbing and descending motion, and a turning motion of the ornithopter can be controlled using the remote controller.

2. Description of the Prior Art

An ornithopter still arouses persons' curiosities due to its nature-friendly shape. There have been continuous attempts to develop the ornithopter as a leisure or toy aircraft that requires relatively lower flight stability.

Recent attempts to develop the ornithopter will be described below.

U.S. Pat. No. 4,729,748 (Mar. 8, 1988) issued to Gerard Van Ruymbeke discloses a flying toy. The flying toy includes a body, main wings and tail wings that have appearances similar to those of a body, wings and a tail of a bird; an elastic band; a wind-up assembly for twisting the elastic band; an activation assembly for activating flapping of the main wings, which are similar to flapping of the wings of the bird, by transferring force released when the twisted elastic band is untwisted; and a latching assembly for latching or locking the main wings when the elastic band is twisted. U.S. Pat. No. 5,163,861 (Nov. 17, 1992) issued to Gerard Van Ruymbeke discloses a wing-operated flying toy and a process for automatically locking the wings at the end of a flight. The flying toy of the '861 patent is constructed such that a locking device, which is similar to the latching assembly of the toy of the '748 patent, locks the main wings even when the toy flies while the elastic band is untwisted.

U.S. Pat. No. 4,749,149 (Jul. 7, 1988) issued to Peter Gruich discloses an ornithopter-type vehicle and methods of constructing and utilizing the same. The ornithopter-type vehicle is designed as an aircraft which is large enough to load persons thereinto. The ornithopter-type vehicle has main wings and a horizontal tail attached to its body in a manner similar to the fixed wing aircraft. An up motion of the flapping of the main wings that move between their higher and lower positions is established by elastic restoring force. A down motion of the flapping is established by power transferred from a power source through a hydraulic circuit. The ornithopter-type vehicle simultaneously obtains both the lift and thrust by the down motion of the main wings in a downward and rearward direction rather than a vertically downward direction from the higher position. The ornithopter-type vehicle is constructed such that its flight attitude is maintained in such a manner that a user controls the motion of the main wings and the position of the horizontal tail through operating levers.

U.S. Pat. No. 5,899,408 (May 4, 1999) issued to Kenneth R. Bowers, Jr. discloses an ornithopter. The ornithopter also has a main wing and a horizontal tail attached to its body in a manner similar to the fixed wing aircraft and employs a gasoline engine as a power source. The ornithopter is provided with flaps formed at the bottoms of the main wing so as to increase the lift obtainable from the flapping of the main wing.

Although such research results regarding the ornithopter have been proposed, there has been scarcely any commercialized power-driven ornithopter because of various factors.

The present inventor(s) has (have) invented an ornithopter including a power transmission mechanism which is lighter, simpler and more durable as compared with the conventional ornithopter, and an electric motor which can be simply operated and provide longer flight time as compared with its weight, which was filed on the same date of filing of the present application. The ornithopter includes a body, a main wing attached to an upper portion of a front section of the body, and tail wings attached to a rear section of the body. Both the electric motor and the power transmission mechanism are installed within a housing of the body. The power transmission mechanism includes a gear train for transmitting a rotational motion of the electric motor at a proper speed, and a connecting rod for converting the rotational motion into a swing motion of the main wing.

According to the ornithopter, a thrust is obtained from a reaction force to an action of pushing air toward the rear of the body by means of the flapping of the main wing. Further, vertical components of the thrust and drag obtained When a nose of the ornithopter is raised according to a vertical swing angle of the horizontal tail are utilized as a lift.

Such a power-driven ornithopter can fly for a considerably long time. Thus, if the ornithopter is left freely without any control thereof, the ornithopter may be flown far away to an extent that it is difficult to retrieve the ornithopter at a site where it has started to fly. Furthermore, the ornithopter is required to be controlled even for arousing interest in a person. However, any documents do not specifically describe the control or operation mechanism of the ornithopter.

SUMMARY OF THE INVENTION

An object of the present invention is to provide a power-driven ornithopter piloted by a remote controller wherein a takeoff and landing motion, a climbing and descending motion, and a turning motion of the ornithopter can be controlled using the remote controller.

Another object of the present invention is to provide a remote control system of a power-driven ornithopter wherein a flying speed of the ornithopter can be controlled by increasing or decreasing a thrust according to a flapping rate of a main wing and a flight altitude of the ornithopter can also be controlled by properly adjusting a vertical swing angle of a horizontal tail according to the flying speed.

An ornithopter of the present invention comprises a body, a main wing attached to an upper portion of a front section of the body, and a horizontal tail attached to a rear section of the body. Further, the ornithopter comprises an electric motor and a first servo motor for rotating by receiving electric power from a battery mounted to the body, a main power transmission mechanism for converting and transmitting the rotational motion of the electric motor into a swing motion of the main wing, a servo power transmission mechanism for adjusting a vertical swing angle of the horizontal tail as the servo motor rotates, and a controller for adjusting rotational direction and speed of the servo motor.

Preferably, the ornithopter further comprises an additional servo motor of which a rotating shaft is connected to a portion corresponding to a central axis of the horizontal tail, whereby a rotating angle of the horizontal tail can be adjusted as the additional servo motor rotates.

Preferably, the ornithopter further comprises a vertical tail disposed at an upper side of the horizontal tail. At this time, it is preferred that a second servo motor be connected to a vertical tail support for supporting the vertical tail so that a horizontal swing angle of the vertical tail can be adjusted by rotating the vertical tail support as the second servo motor rotates.

Further, the controller may control the rotational direction and speed of each of the servo motors by regulating driving power supplied from the battery to servo motor.

Furthermore, the controller may comprise a speed controller using a MOSFET (Metallic Oxide Semiconductor Field Effect Transistor).

It is also preferred that the controller be constructed to regulate driving power supplied to each of the servo motors in response to control signals received from a remote control transmitter.

It is more preferred that the controller be constructed to adjust a swing speed of the main wing by regulating the driving power supplied to the electric motor for actuating the main wing in response to the control signals received from the remote control transmitter.

Herein, if it is not specifically described, it should be understood that all the terms for designating the directions are used to refer to directions based on the ground in a state where the ornithopter of the present invention is placed on the ground with a normal attitude.

BRIEF DESCRIPTION OF THE DRAWINGS

The above and other features, advantages, and aspects of the present invention will become more apparent when reading the following description of preferred embodiments of the present invention given in conjunction with the accompanying drawings, in which:

FIGS. 8 and 9 are enlarged views illustrating a state where tail wing supports and actuating elements for actuating the tail wing supports are mounted adjacent to a rear end of the keel panel, wherein

DETAILED DESCRIPTION OF THE PREFERRED EMBODIMENTS

Hereinafter, preferred embodiments of the present invention will be described in detail with reference to the accompanying drawings.

Figure 1:
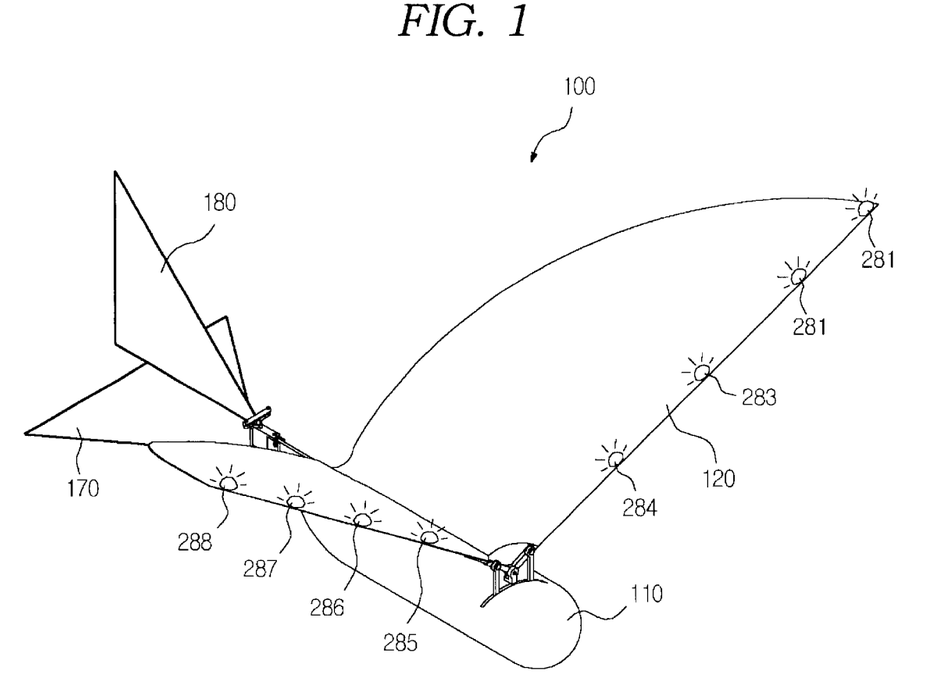
FIG. 1 is a perspective view of an ornithopter according to an embodiment of the present invention.

As shown in FIG. 1, an ornithopter 100 of the present invention comprises a body 110, a main wing 120 attached to an upper portion of a front section of the body 110, and tail wings 170, 180 attached to a rear section of the body 110.

An electric motor 221 and a power transmission mechanism 230, which will be explained in detail later, are installed within a housing of the body 110.

Figure 2:
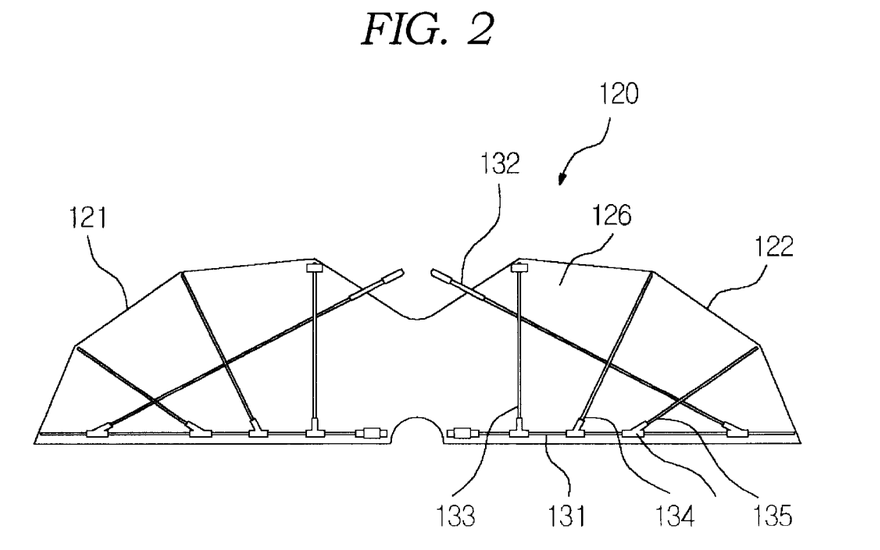
FIG. 2 is a deployment view of a main wing of the ornithopter shown in FIG. 1.

As shown in FIG. 2, the main wing 120 is composed of a skin 126 for forming a surface of the main wing and frame rods for maintaining a shape of the main wing and is integrally formed with left and right main wings 121, 122 which are symmetric to each other with respect to a central axis of the body 110.

Each of the left and right main wings 121, 122 includes a single front frame rod 131, a single rear frame rod 132, and a plurality of traverse frame rods 133, 134 and 135.

The front and rear frame rods 131, 132 of the left main wing 121 are separated from those of the right main wing 122, and the left main wing 121 is connected to the right main wing 122 by means of only the flexible skin 126. Thus, the left and right main wings 121, 122 can move freely with respect to each other in a direction that they are folded or deployed.

The tail wings of the ornithopter 100 according to the embodiment are composed of a single horizontal tail 170 and a single vertical tail 180 disposed at an upper side of the horizontal tail 170.

Figure 3:
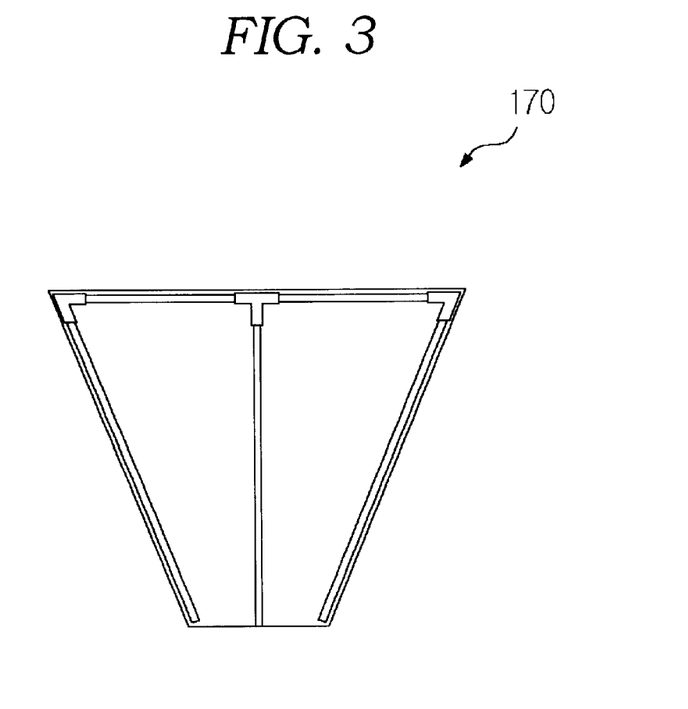
FIG. 3 is a plan view of a horizontal tail of the ornithopter shown in FIG. 1.

As shown in FIG. 3, the horizontal tail 170 is constructed to be symmetric in a state where its width is increased in a backward direction along the central axis of the body 110. Further, the horizontal tail is attached to the rear section of the body 110 at an apex of the horizontal tail 170.

Figure 4:
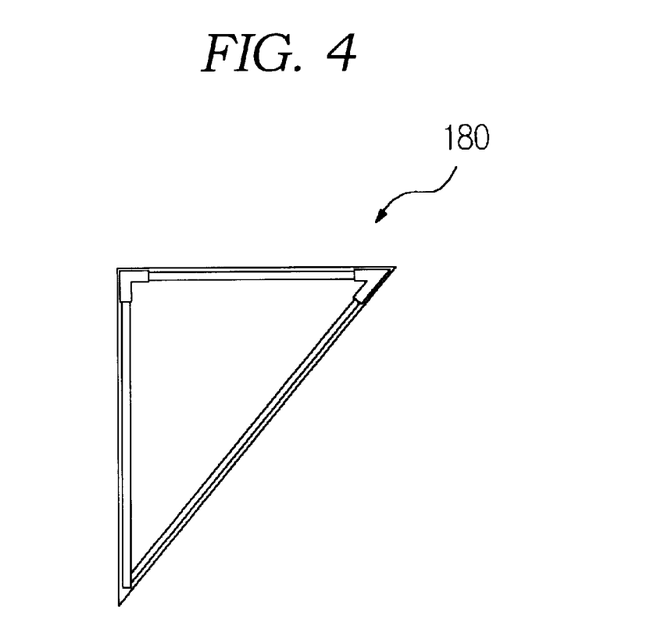
FIG. 4 is a side view of a vertical tail of the ornithopter shown in FIG. 1.

As shown in FIG. 4, the vertical tail 180 is a substantially right-angled triangle. The vertical tail 180 is disposed perpendicularly onto an upper surface of the horizontal tail 170 and attached to the rear section of the body 110 at an apex of the vertical tail 180, as shown in FIG. 1.

Figure 5:
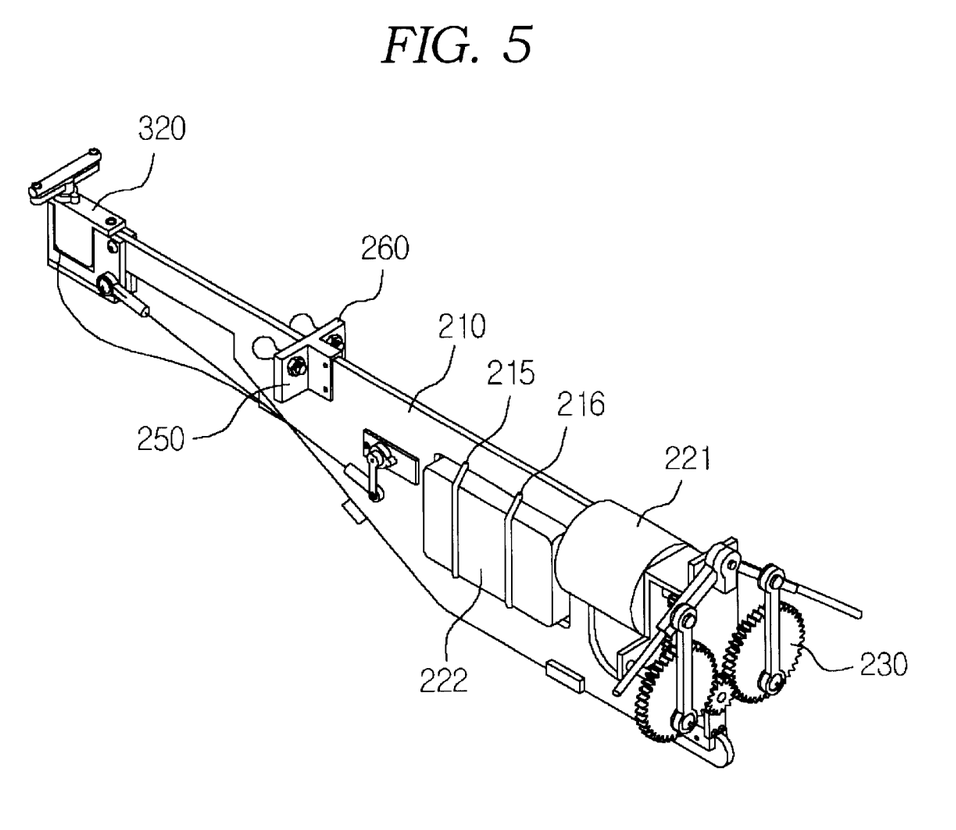
FIG. 5 is a perspective view of components installed within a body of the ornithopter shown in FIG. 1.

FIG. 5 shows the interior of the body 110 with the housing removed therefrom.

Figure 6:
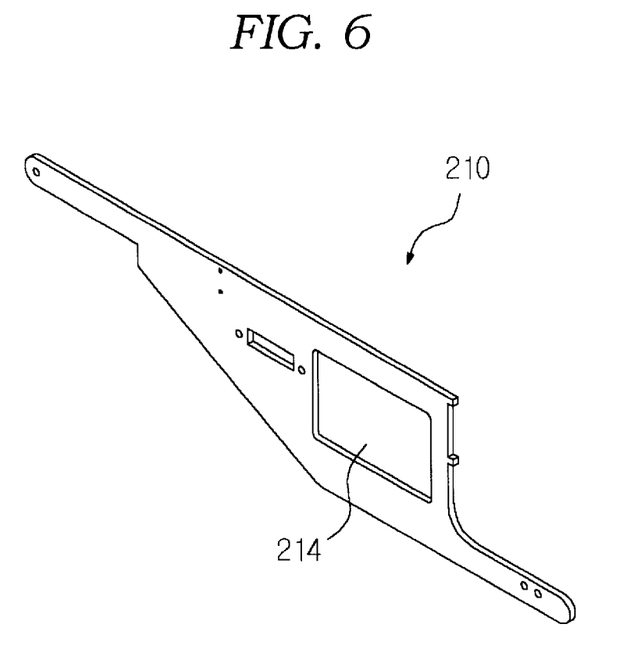
FIG. 6 is a perspective view of a keel panel of the body of the ornithopter shown in FIG. 1.

A keel of the body 110 of the ornithopter 100 according to the embodiment of the present invention is formed with a lightweight and rigid unitary panel, as shown in FIG. 6. As shown in FIGS. 5 and 6, such a keel panel 210 is disposed along the central axis of the body 110. The keel panel 210 has a length extending from the vicinity of the front section to the vicinity of the rear section of the body 110 and a width extending from an upper end to a lower end of the body 110.

The electric motor 221 is mounted to an upper front end of the keel panel 210, and the power transmission mechanism 230 is mounted in front of the electric motor 221. A battery mounting hole 214 is formed at a central portion of the keel panel 210. The battery 222 is inserted into the battery mounting hole 214 and then firmly fastened by clamps 215, 216. Further, holders 250, 260 for holding the rear frame rods 132 of the left and right main wings 121, 122, respectively, are mounted to an upper end of the keel panel 210. Supports 271, 272 for supporting the tail wings 170, 180, respectively, are mounted to a rear end of the keel panel 210.

Figure 7:
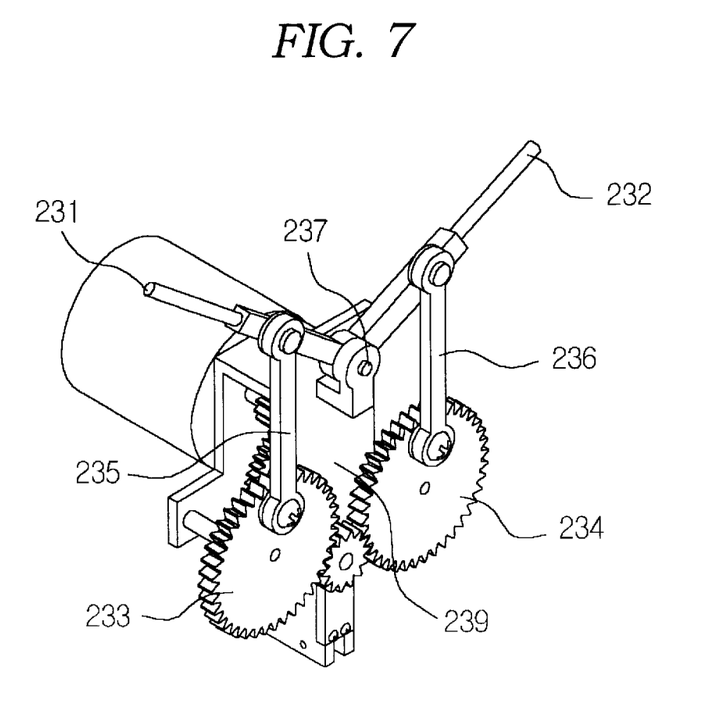
FIG. 7 is a perspective view of an assembly of an electric motor and a power transmission mechanism of the ornithopter shown in FIG. 1.

The power transmission mechanism 230 comprises a pair of arms 231, 232 which are connected to the front frame rods 131 of the left and right main wings 121, 122, respectively; a pair of driven wheels 233, 234 which rotate by means of the rotational motion of the electric motor 221 transmitted through one or more intermediate power transmission geared-wheels; connecting rods 235, 236 which connect the driven wheels 233, 234 and the arms 231, 232, respectively, and swing the arms 231, 232 up and down within a predetermined angular range on a pivotal point 237, respectively, as the driven wheels 233, 234 rotate; a reduction gear train which is engaged with a rotating shaft of the electric motor 221 and the pair of driven wheels 233, 234, and reduces and simultaneously transfers the rotational motion of the electric motor 221 to the pair of driven wheels 233, 234; and a stand 239 for fixing and holding the reduction gear train.

As the arms 231, 232 are swung, the main wing 120 of which front frame rods are connected to the pair of arms 231, 232 of the power transmission mechanism 230 flaps in an up and down direction.

The rear frame rods of the main wing 120 are supported to be freely movable by means of the supporting holders 250, 260 installed at the upper end of the keel panel 210.

As shown in FIG. 1, the housing is assembled around the keel panel 210 in the following manner. That is, the main wing 120 is exposed to the outside of the housing so that the flapping thereof can be freely made. Further, the horizontal tail 170 is exposed to the outside of the housing so that a vertical swing angle thereof can be controlled, and the vertical tail 180 is also exposed to the outside of the housing so that a horizontal swing angle thereof can be controlled.

The lightweight and high capacity battery 222 such as a lithium battery is mounted into the battery mounting hole 214 of the keel panel 210 in such a manner that charging terminals thereof can be exposed to the outside of the housing.

Figure 8:
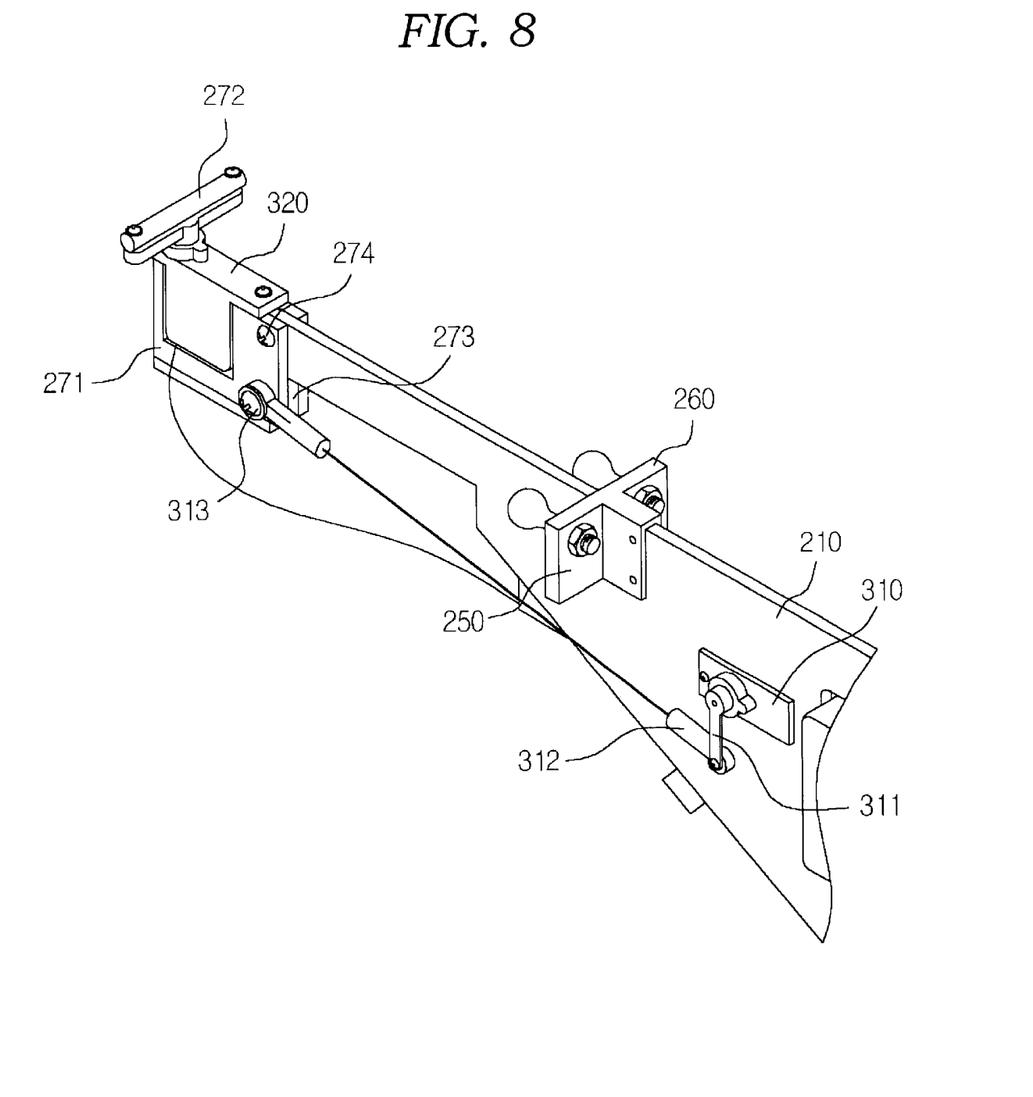
FIG. 8 is a perspective view of the combined structure viewed from a left side of the keel panel and FIG. 9 is a perspective view of the combined structure viewed from a right side of the keel panel.
Figure 9:
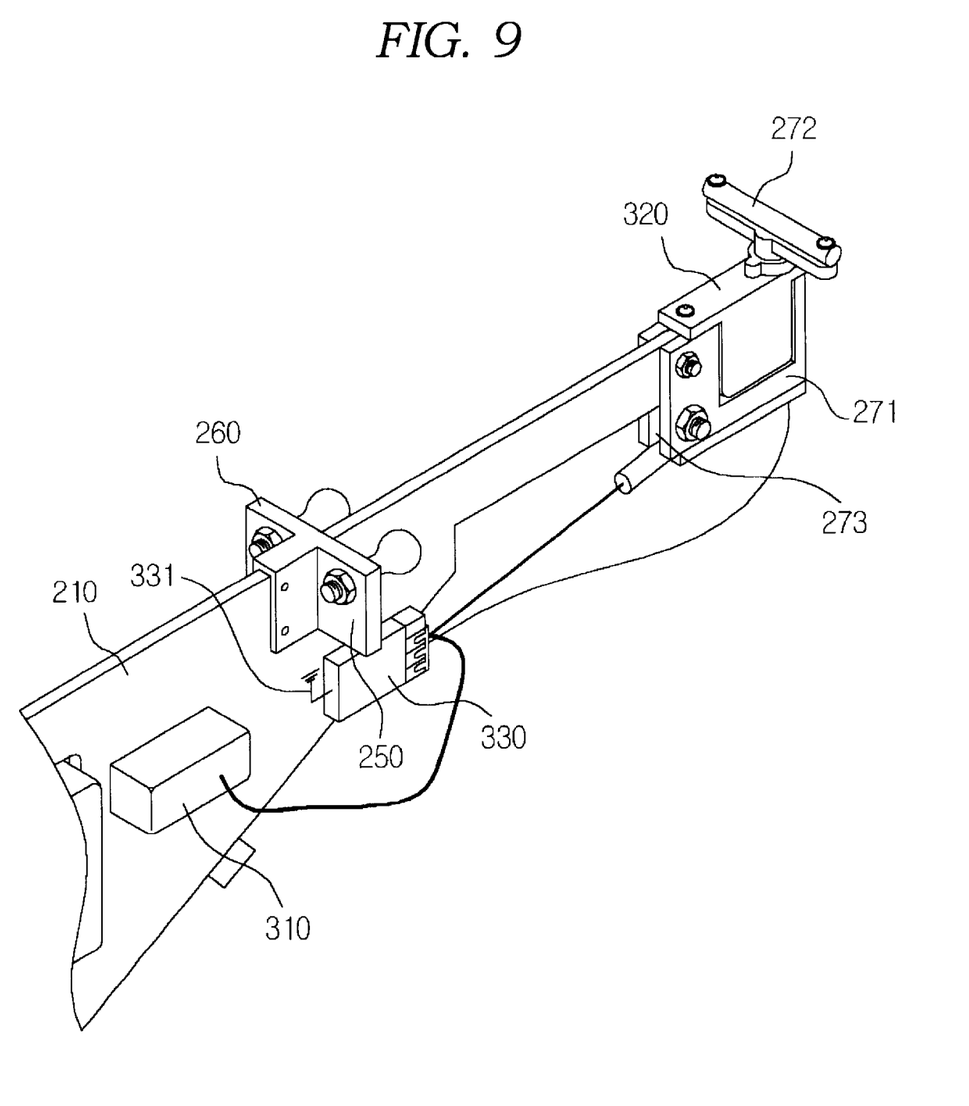

FIGS. 8 and 9 show tail wing supports mounted to the rear end of the keel panel 210 and actuating elements for controlling the vertical swing angle of the horizontal tail 170 and the horizontal swing angle of the vertical tail 180 by actuating the tail wing supports according to the embodiment of the present invention. The tail wing supports includes a horizontal tail support 271 for supporting the horizontal tail 170 thereon and a vertical tail support 272 for supporting the vertical tail 180 thereon. The horizontal tail support 271 is in the form of a rectangular parallelepiped with a predetermined height, and is also provided at an upper edge thereof with a slit 273 into which the rear end of the keel panel 210 can be inserted. After the rear end of the keel panel 210 has been inserted into the slit 273, they can be connected to each other by means of a fixing pin 274 so that the horizontal tail support 271 can be swung on the pin 274 in the up and down direction.

A first servo motor 310 serving as an actuating element for actuating the horizontal tail support 271 to regulate the vertical swing angle of the horizontal tail 170 is mounted onto the keel panel 210. A crank arm 311 is connected to a rotating shaft of the first servo motor 310, and a connecting rod 312 connected to a free end of the crank arm 311 is then pivotally connected to a pivot 313 formed at a lower edge of the horizontal tail support 271. The crank arm 311 and the connecting rod 312 function as a crank mechanism for causing the horizontal support 271 to be swung on the pin 274 as the servo motor 310 rotates.

A second servo motor 320 serving as another actuating element for actuating the vertical tail support 272 to regulate the horizontal swing angle of the vertical tail 180 is mounted into a recess formed at an tipper side of the rectangular parallelepiped of the horizontal tail support 271. At this time, a rotating shaft of the second servo motor 320 is disposed on the central axis of the horizontal tail. The vertical tail support 272 engaged with the rotating shaft of the second servo motor 320 can be swung on the rotating shaft in the lateral direction as the second servo motor 320 rotates.

Driving power is supplied from the battery 222 to the first and second servo motors 301, 320. Onto the keel panel 210 is mounted a controller 330 for controlling the supply of the driving power so as to adjust the rotating direction and speed of the first and second servo motors 310, 320. The controller 330 can be constructed in the form of a speed controller using MOSFET (Metallic Oxide Semiconductor Field Effect Transistor) available from the market, and receive a control signal from a remote control transmitter (not shown) which is also available from the market.

In order to facilitate receipt of the control signal, the controller 330 includes a receiving antenna 331 which is constructed in the form of a linear antenna made of wire and attached to a surface of the body or the tail wings.

The similar type of transmitter used in the remote control of a toy vehicle or toy fixed-wing aircraft may be utilized as the remote control transmitter.

The controller 330 controls the vertical swing angle of the horizontal tail 170 and the horizontal swing angle of the vertical tail 180 by rotating the first and second servo motors 310, 320, respectively, depending on the speed and direction according to the control signal received from the remote control transmitter.

Further, the controller 330 can also adjust the swing speed of the main wing by regulating the driving power supplied to the electric motor 221 for actuating the main wing 120 in response to the control signal received from the remote control transmitter.

Hereinafter, the operation of the ornithopter 100 according to the embodiment of present invention will be explained.

The ornithopter of the present invention is constructed such that the left and right main wings 121, 122 flap in the up and down direction as the electric motor 221 is driven. The motion of the main wing generates an air stream with which air flows backward along the body in the same manner as the fanning action, and a reaction force produced by the motion acts only as a thrust for moving the body forward. By the way, if the horizontal tail 170 is kept in a state where it is not horizontal but raised, a nose of the ornithopter is raised due to a reaction force to which the horizontal tail 170 is subjected by the forward flying of the ornithopter. When the nose of the ornithopter is raised, only a horizontal component of the reaction force serves as the thrust because a vertical component of the reaction force serves as a lift for causing the ornithopter to climb. Furthermore, when the ornithopter advances in a horizontal or gliding direction in the state where the nose thereof is raised, the body and main wing have a slant attack angle with respect to a direction of a relative wind which flows along the vicinity of the body and main wing due to the advancement of the ornithopter. The attack angle has an influence on the direction and magnitude of a drag exerted on the body and main wing by the relative wind. A vertical component of the drag acts on the body and main wing as the lift, whereas a horizontal component of the drag acts in a direction opposite to that of the thrust.

That is, by controlling the vertical swing angle of the horizontal tail, the magnitude of the attack angle corresponding to the raised degree of the nose of the ornithopter is adjusted. Consequently, the lift is adjusted, and thus, the ornithopter can climb or descend.

Meanwhile, in a case where the vertical tail 180 is provided as shown in the preferred embodiment of the present invention, a straight flight of the ornithopter can be made by aligning the vertical tail 180 in the same direction as the central axis of the body 110. Further, left and right turns of the ornithopter can be made by deflecting or rotating the vertical tail 180 to the left and right, respectively.

The ornithopter of the present invention can fly after running on the ground up to a predetermined speed by using landing gears (not shown) provided on the bottom of the body 110. Alternatively, the ornithopter can be slightly thrown forward and then flown after the main wing has started to flap by grasping the body 110 with a hand and turning on a power switch.

If the altitude of the ornithopter is to be increased, the horizontal tail 170 should be raised by transmitting a control signal to the first servo motor 310 through the remote control transmitter so as to cause the first servo motor 310 to rotate in a first direction. Furthermore, if the altitude of the ornithopter is to be decreased, the horizontal tail 170 should be lowered by transmitting a control signal to the first servo motor 310 so as to cause the first servo motor 310 to rotate in a second direction opposite to the first direction.

If the ornithopter is to be turned in a clockwise direction, the vertical tail 180 should be swung to a right side of the body 110 by transmitting a control signal to the second servo motor 320 through the remote control transmitter so as to cause the second servo motor 320 to rotate in a first direction. Furthermore, if the ornithopter is to be turned in a counterclockwise direction, the vertical tail 180 should be swung to a left side of the body 110 by transmitting a control signal to the second servo motor 320 so as to cause the second servo motor 320 to rotate in a second direction opposite to the first direction.

If the flying speed of the ornithopter is to be increased, the flapping rate of the main wing 120 should be increased by transmitting a control signal to the electric motor 221 through the remote control transmitter so as to increase the driving power supplied to the electric motor 221. Furthermore, if the flying speed of the ornithopter is to be decreased, the flapping rate of the main wing 120 should be decreased by transmitting a control signal to the electric motor 221 through the remote control transmitter so as to decrease the driving power supplied to the electric motor 221.

Furthermore, since one or more light emitting diodes 281–288 are attached to a front edge of the main wing of the ornithopter according to the preferred embodiment of the present invention, the position, attitude and flying direction of the ornithopter can be easily recognized even at night.

Although the ornithopter of the aforementioned preferred embodiment of the present invention includes both the horizontal and vertical tails 170, 180, the vertical tail 180 may be omitted or removed in order to reduce weight of the ornithopter and to simplify the constitution of the ornithopter. That is, only the horizontal tail 170 may be provided in the ornithopter of the present invention.

In such a case, it is preferred that the horizontal tail 170 be constructed to be able to control a rotating angle as well as the vertical swing angle. Here, the rotating angle of the horizontal tail 170 means not an angle by which left and right ends of the horizontal tail are kept at the same level as each other but an angle by which the horizontal tail 170 rotates with respect to the central axis thereof so that any one of the left and right ends of the horizontal tail is disposed to be lower or higher than the other end. More preferably, an additional servo motor of which a rotating shaft is connected to a portion corresponding to the central axis of the horizontal tail 170 is further provided, so that the rotating angle of the horizontal tail 170 can be controlled as the additional servo motor rotates.

Similarly to the ornithopter of the previous preferred embodiment of the present invention, the ornithopter of this preferred embodiment of the present invention in which only the horizontal tail is used can climb or descend by adjusting the vertical swing angle of the horizontal tail 170 and be turned to the left or right by adjusting the rotating angle of the horizontal tail 170.

Although the ornithopter according to the preferred embodiment shown in the figures includes all the horizontal and vertical tails, the vertical tail may be removed. In other words, only the horizontal tail can be utilized for controlling the climbing and turning motions of the ornithopter by constructing the horizontal tail such that it can rotate within a predetermined angular range about a axis of the rotation parallel to the central axis of the body while the vertical swing angle thereof can be controlled.

The ornithopter 100 of the present invention can he piloted in a wireless remote control mode. Further, the ornithopter is lightweight and can obtain a great lift even at a low flying speed in which energy consumption is low. Therefore, longer flight can be made if the battery is only once charged.

Heretofore, the ornithopter of the present invention has been described with reference to the preferred embodiments thereof. However, they are merely examples of the present invention and do not intend to limit the present invention. It will be apparent to those skilled in the art that various modifications, changes or adjustments can be made thereto without departing from the technical spirit and scope of the invention. Therefore, the appended claims intend to include such various modifications, changes or adjustments.

What is claimed is:

1. An ornithopter having a body, a main wing attached to an upper portion of a front section of the body, and a horizontal tail attached to a rear section of the body, wherein the ornithopter comprises:
   a battery mounted to the body;
   an electric motor and a first servo motor capable of rotating by receiving electric power from the battery;
   a main power transmission mechanism for converting and transmitting the rotational motion of the electric motor into a swing motion of the main wing;
   a servo power transmission mechanism for adjusting a vertical swing angle of the horizontal tail as the first servo motor rotates; and
   a controller for adjusting a rotational direction and speed of the first servo motor.

2. The ornithopter as claimed in claim 1, further comprising an additional servo motor of which a rotating shaft is connected to a portion corresponding to a central axis of the horizontal tail, whereby a rotating angle of the horizontal tail can be adjusted as the additional servo motor rotates.

3. The ornithopter as claimed in claim 1, further comprising a vertical tail disposed at an upper side of the horizontal tail.

4. The ornithopter as claimed in claim 3, further comprising a second servo motor of which a rotating shaft is connected to a vertical tail support for supporting the vertical tail, whereby a horizontal swing angle of the vertical tail can be adjusted by rotating the vertical tail support as the second servo motor rotates.

5. The ornithopter as claimed in claim 1, wherein the controller adjusts the rotational direction and speed of each of the servo motors by regulating driving power supplied from the battery to the respective servo motors.

6. The ornithopter as claimed in claim 5, wherein the controller includes a speed controller using a MOSFET (Metallic Oxide Semiconductor Field Effect Transistor).

7. The ornithopter as claimed in claim 6, wherein the controller adjusts the driving power supplied to each of the servo motors in response to control signals received from a remote control transmitter.

8. The ornithopter as claimed in claim 7, wherein the controller adjusts a swing speed of the main wing by regulating the driving power supplied to the electric motor for actuating the main wing according to control signals received from a remote control transmitter.

9. The ornithopter as claimed in claim 1, wherein the main wing includes a wing frame composed of a plurality of frame rods and a skin attached to the wing frame for forming an outline of the main wing; the wing frame of the main wing is supported by a support exposed to the outside at an upper portion of the body; and the power transmission mechanism includes a gear train for adjusting the rotational motion of the electric motor at a proper speed and transferring it to the main wing, and a connecting rod for converting the rotational motion into the swing motion of the main wing.

10. The ornithopter as claimed in claim 9, wherein a horizontal tail support for supporting the horizontal tail is formed to be a rectangular parallelepiped and is supported at its upper edge by a rear end of a keel panel of the body to be swingable on the rear edge of the keel panel; a crank arm is connected to a rotating shaft of the first servo motor for adjusting the vertical swing angle of the horizontal tail; a free end of the crank arm is connected to an end of a connecting rod; and another end of the connecting rod is pivotally connected to a lower edge of the horizontal tail support.

11. The ornithopter as claimed in claim 4, wherein the second servo motor for adjusting the horizontal swing angle of the vertical tail is mounted into a recess formed at an upper side of the rectangular parallelepiped of the horizontal tail support and the rotating shaft of the second servo motor is disposed on a central axis of the horizontal tail.

12. The ornithopter as claimed in claim 1, further comprising at least one light emitting diode attached to a front edge of the main wing.

* * * * *